United States Patent [19]

Griffith et al.

[11] Patent Number: 4,531,270
[45] Date of Patent: Jul. 30, 1985

[54] METHOD FOR THE MANUFACTURE OF METAL VANES FOR TURBOMACHINERY

[75] Inventors: James B. Griffith, Ellington; Harold C. Sanborn, Bolton, both of Conn.

[73] Assignee: United Technologies Corporation, Hartford, Conn.

[21] Appl. No.: 620,292

[22] Filed: Jun. 13, 1984

[51] Int. Cl.³ .......................... B21K 3/04; B23P 15/02
[52] U.S. Cl. .......................... 29/156.8 B; 29/156.8 R; 29/163.5 R; 29/412; 29/415; 29/DIG. 15; 29/DIG. 37; 72/177; 72/180; 72/203; 72/206; 416/223 R
[58] Field of Search ........... 29/23.5, 156.8 R, 156.8 P, 29/156.8 B, 163.5 R, 412, 415, 418, 557, 558, DIG. 15, DIG. 37; 72/177, 180, 203, 206; 416/223 R

[56] References Cited

U.S. PATENT DOCUMENTS

| | | | |
|---|---|---|---|
| 450,836 | 4/1891 | Evans | 72/203 |
| 814,804 | 3/1906 | Rateau et al. | 29/156.8 B |
| 881,409 | 3/1908 | Jude | 29/156.8 R |
| 1,035,545 | 8/1912 | Dake | 29/156.8 B |
| 1,072,233 | 9/1913 | Imle | 29/156.8 B |
| 1,127,740 | 2/1915 | Dake | 29/156.8 B |
| 2,148,672 | 2/1939 | Arentzen | 29/558 X |
| 4,320,647 | 3/1982 | Kummeling et al. | 72/203 |
| 4,357,819 | 11/1982 | Elley | 72/204 |

FOREIGN PATENT DOCUMENTS

| | | | |
|---|---|---|---|
| 175231 | 9/1906 | Fed. Rep. of Germany | 29/156.8 R |
| 2533230 | 10/1977 | Fed. Rep. of Germany | |
| 520069 | 4/1957 | Italy | 29/156.8 R |
| 401338 | 4/1966 | Switzerland | 29/156.8 R |

Primary Examiner—Charlie T. Moon
Assistant Examiner—Ronald S. Wallace
Attorney, Agent, or Firm—C. G. Nessler

[57] ABSTRACT

To make vane airfoils for an axial flow compressor metal strip is first contour rolled to a cross section comprised of two opposing airfoils separated by a center rib, where one of the faces of the strip is kept planar. The rib is used to guide the strip into dies where it is notched and slotted to define individual airfoils. Next, die stamping makes concave the planar surface of each airfoil.

4 Claims, 4 Drawing Figures

2

METHOD FOR THE MANUFACTURE OF METAL VANES FOR TURBOMACHINERY

TECHNICAL FIELD

The present invention relates to metalworking, particularly to the roll forming and pressing of airfoil parts of gas turbine engines.

BACKGROUND

In the compressor section of an axial flow turbomachine, there are both vanes and blades. The vanes, also called stators, are static structures and have the function of turning the direction of airflow. The cross section of a vane is in the shape of an airfoil and a typical part may have a length of about 50-80 mm, a chord length of about 25 mm and a maximum cross section thickness of about 2.5 mm. A vane assembly is comprised of a multiplicity of vanes disposed radially around the circumference of an annulus. In a typical vane assembly, there are inner and outer circumferential ring members, both made of sheet metal. The vanes are fitted and brazed into slots in both members, connecting them together radially, much as the spokes of a wheel connect the rim to the hub. In advanced gas turbines, some of the vanes are made of high temperature capability nickel alloys, for use in the hotter high pressure portions of the compressor. Vanes must be manufactured to precise dimensions and must be accurately placed in their assembly for engines to obtain highest efficiency. But nickel alloys, especially superalloys are often difficult to work and it has not been easy to precisely shape the airfoil.

While full machining of a solid could be used, precision forging has been preferred for economic reasons in the production of vanes. However, precision forging is limited in the accuracies obtainable and the tolerance variation must be accommodated in the fits of the circumferential rings into which the vanes are received and brazed. The resultant fit allowance means that the size of the braze gap is greater than desired and there will be more variation in vane alignment than may be optimal. The more there is deviation from the theoretical perfection of the design, the less the efficiency of the engine. Thus, there has been a need to make airfoils in a more precise manner and it is to this that the present invention is directed.

The present invention involves rolling of sheet metal and there is much technology relating to such. But a particular pertinent part of the prior art is reflected in U.S. Pat. No. 4,320,647 to Kummeling et al. The patent describes the forming of door hinges by stamping them from a contour rolled piece of metal strip. The strip rolling process involves making a cross section in which two opposing similar cross sections are divided by a groove running in the longitudinal direction of the strip. The longitudinal groove is used as a guide for locating the strip when it passes through a stamping die. Somewhat similar procedures have been used in part of the present invention. But improvements have been necessary to accurately produce the more precise and more complex cambered structure which constitutes a gas turbine engine vane.

DISCLOSURE OF THE INVENTION

An object of the invention is to accurately and economically manufacture airfoils which have cambered cross sections and concave shapes.

According to the invention a unique sequence of steps is used to make the vanes. First, ordinary metal strip having rectangular cross section is contour rolled to a cross section characterized by a planar surface on one side and a central rib running along the length of the strip on the opposing side. On either side of the rib the cross section is characteristic of an airfoil; the thinner parts of the opposing airfoil shapes are adjacent the rib. This shaping and the symmetry of cross section facilitate both the rolling operation and the subsequent bending operations. Next, the contour formed strip is slotted both transversely and longitudinally to create openings which define essentially rectangular airfoil shaped members on either side of the rib line. These members are connected at their longitudinal ends, along the length of the strip, by webs. There are also cross members which connect webs on opposing sides of the rib line with each other, and these cross members have in their center the original rib shape. Thus, the latticework structure created by the slotting operation maintains the spatial relationship of the rectangular airfoil members to each other, and with respect to a die, by virtue of the engagement of the rib artifacts with suitable engaging means in the die. The shape and placement of the webs at the ends of the airfoils permits concave bending of each airfoil about its longitudinal axis in the next step. Pressing by means of a die, preferably by applying slowly a force to the airfoil and sustaining the force momentarily at the maximum airfoil bending deflection will lessen springback. Lastly, the connecting webs are removed from the airfoils to make them separate, and to accurately define the end shapes. The vanes are then final finished as desired.

Because of the special planar sided cross section which is employed in the contour rolling operation, much precision can be embodied in the formed strip. This precision carries through the stamping operation. And, the use of the rib in cooperation with the latticework webbing means that the airfoil parts are accurately bent to the desired vane contour in a rapid and cost effective manner.

The foregoing and other objects, features and advantages of the present invention will become more apparent from the following description of preferred embodiments and accompanying drawings.

BEST MODE FOR CARRYING OUT THE INVENTION

The present invention is described in terms of the making of a vane for an axial flow turbomachine, where the vane has the nominal size described in the Background and is made of a wrought nickel superalloy such as Waspaloy, IN-718 or Inconel X-750. It will be evident that the invention is also useful in the manufacture of other analogous machine parts made of other materials.

Figure 1:
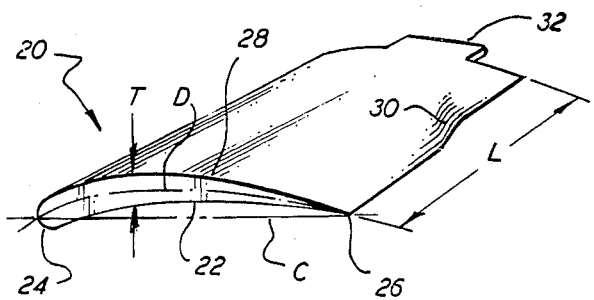
FIG. 1 shows in perspective a typical cambered airfoil having a convex shape.

As used herein, the term vane refers to an airfoil 20 (any member adapted to direct the flow of air or gas) which is cambered and which has a concave side 22 as shown in the FIG. 1 drawing. The vane has a length L, a maximum thickness T and a chord C extending from the leading edge 24 to the trailing edge 26. The degree of curvature of the vane is reflected in the contour of the mean camber line D which is the mid point between the concave surface 22 and the opposing convex surface 28. The camber and cross sectional dimensions may vary along the length of a vane and in fact, in the Figure is shown a vane which has a complex trailing edge contour section 30, which is not unusual. At one end of the vane is a tab 32. This is a structural feature on certain vanes, to enable their incorporation in the circumferential rings which hold the vanes. In the present invention the cross sectional area of the vane is nominally constant along its length, except for the portion in the vicinity of the "dog-leg" 30.

Figure 2:
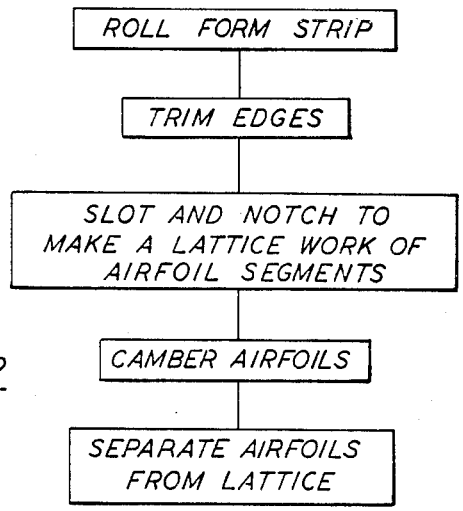
FIG. 2 is a flow diagram showing the sequential steps of the present invention.

The sequential steps in the making of a vane according to the present invention are diagramatically shown in FIG. 2. In summary, the rolling step converts a rectangular cross section strip into the section shown in FIG. 3. The formed strip is then slit or trimmed by other means, to eliminate the normal edge flashing. Then, the formed strip is inserted into a progressive die or series of dies for slotting; followed by pressing to make the part concave; followed by a shearing to separate the individual vanes.

Figure 3:
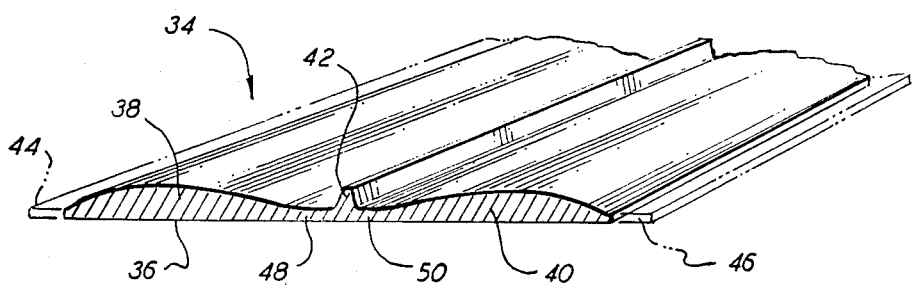
FIG. 3 is a perspective view of the planarsided formed strip which is contour rolled in the initial steps of the invention.

FIG. 3 shows the formed strip 34 produced in the rolling operation. Two or more rolling stations, such as two-high rolling mills, are used. In the first station the sheet metal is formed to a cross section nominally congruent with the final section, but which is approximately 20% over the final thickness. At the second station, the metal strip is finish formed to a cross section like that shown in FIG. 3. At each station successive passes and closure of the rolls are used; annealing of the strip is utilized as appropriate to eliminate work hardening and to facilitate the rolling. The total reduction of the strip, as measured at the thickest final location, is about 50 percent.

As FIG. 3 shows, one face 36 of the strip 34 is planar while the opposing side is contoured. The cross section is characterized by two opposing symmetrical sections 38, 40, each having a typical tapered airfoil shape, the thinner portions 48, 50 of which face each other across the center line of the strip. To the extent typical flashings 44, 46 (shown in phantom) result at the edges of the strip, they are removed in a conventional slitting or shearing operation. The cross section is symmetrical laterally but asymmetrical vertically.

A rib 42 runs lengthwise along the center of the strip. The rib 42 facilitates the successive rolling passes of the strip in that its pronounced shape provides a better guide for the strip as it enters the rolls than is provided by the gradual contour of the airfoils. Wandering is prevented. Further, the forming of a planar surface on one side means that very precise control over cross section thickness can be obtained at any given lateral location across the face of the strip. This is contrasted with a situation where contours are formed on both of the opposing surfaces. In such cases lateral misalignment of the rolls with respect to one another leads to thickness errors. A still further advantage in the cross section which is shown in FIG. 3 is that during forming, the tendency for center-plane shear failure is decreased. With the materials we have used, when a totally symmetrical cross section is subjected to heavy reductions, a lateral plane shear fracture can result. In the forming of the FIG. 3 cross section, the vertical location of the maximum shear plane in the rolled metal cross section is believed to progressively shift during successive rolling passes. Thus, the problem is minimized. Of course, repetitive anneals will avoid such failures, also. However, the present invention has the advantage of minimizing the number of anneals which are required.

Figure 4:
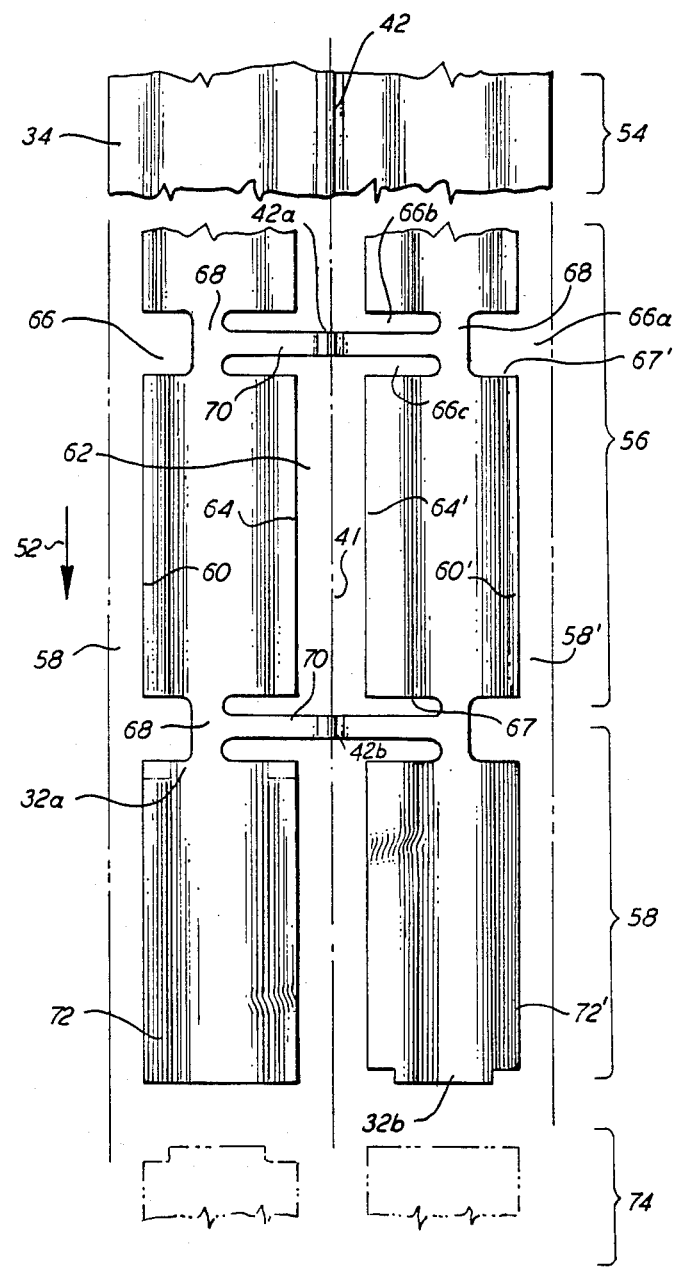
FIG. 4 shows the progressive conversion of the contour strip shown in FIG. 3 into the finished vane shown in FIG. 1, as the progression occurs in sequential die stamping and forming operations.

Next, the formed strip is passed through a progressive die or a series of dies, to form from it the finished vanes. The progressive change is illustrated by FIG. 4 which shows the strip as viewed from its top surface as it passes through the die in the direction indicated by the arrow 52. The strip 34 shown at location 54 has the same contour as that shown in FIG. 3. The center rib 42 is used to guide the strip into the die. The first die stamping operation is shown at location 56 and it is a notching or slotting of the strip. Substantial portions of the strip are removed and discarded; specifically, exterior pieces 58, 58' are removed to define the leading edges 60, 60' of the airfoils. A longitudinal slot 62 is made in the center of the strip, thus removing the part of the rib which was present there and defining the trailing edges 64, 64' of the airfoils. Transverse slots 66, 66a, 66b, 66c are made to define the ends 67, 67' of the airfoil rectangles. The slotting and notching leaves a lattice-work of airfoil rectangles connected by longitudinal webs 68, with the longitudinal webs on opposing sides of the strip centerline 41 connected by cross member webs 70. The network of webs keeps the airfoils in a defined spatial relationship. And residual portions 42a, 42b of the rib are still present on the cross webs, so they may be engaged with mating guides in the die, to enable accurate positioning of the airfoils in the die. The webs 68 connect the longitudinally adjacent airfoils generally at the thickest portion of their cross sections. As will be appreciated, the small size and placement of the longitudinal webs permits achievement of the foregoing objects but at the same time does not interfere with the cambering which will be described now.

In the foregoing slotting and notching operation, the airfoils retained their cross section shape as is shown in FIG. 3; namely, each has one planar side. In the next operation, shown at location 58 in FIG. 4, the airfoils are bent or cambered, to produce the parts 72, 72'. The planar sides are made concave so that the airfoils become vanes and are shaped like the part 20 shown in FIG. 1. Various conventional dies and presses can be used to accomplish this bonding result but preferably a press, such as a hydraulic type press, is used which both applies sufficient force to deform the article and then sustains the deforming load momentarily (for about 0.1–3.0 seconds) at the maximum closure of the dies. The sustained load will minimize springback. In the bending operation, the concave side of the airfoil is very minimally (nominally 1%) elongated, while the convex side 28 is substantially elongated (nominally 5%).

At the next location 74, not shown in detail in the Figure, the cambered airfoils 72, 72' are further die stamped to remove them from their connecting webs and to more precisely define the ends, such as the tabs 32a, 32b, shown in phantom on the parts at location 58. At this point the parts are essentially finished insofar as the invention is concerned. But of course the leading and trailing edges are still to be rounded, such as by mass finishing and various other surface treatment and minor finishing operations will be performed, as are familiar in the metalworking trade.

As indicated above, the thickness dimensions of the airfoil cross section are established by the rolling operation. The thickness of the formed strip cross section at any given point is calcuable from the dimensions desired in the final part, taking into account the bending or cambering operation which is subsequently performed.

As an example of the practice of the invention, airfoils made of the alloy IN 718 (by weight percent, 19 Cr, 18 Fe, 0.9 Ti, 0.6 Al, 3 Mo, 5.2 (Nb+Ta), 0.1 C, balance Ni) are made from a strip which is about 57 mm wide by 3.8 mm thick. A first set of roughing rolls (one side contoured and the other side cylindrical) is used to produce about 80% of the total reduction desired during rolling. About 3 annealings at 1080° C. are used during the rolling operation, whenever the hardness of the material exceeds $R_c$ 45. Then, a second set of finished rolls (one contoured and the other cylindrical) are used to finish the strip. The rib thus formed is about 5-6 mm high and about 2-3 mm wide. The strip is about 0.7 mm thick immediately adjacent the rib and about 2 mm thick at the thickest airfoil portion (38, 40) away from the center rib. Conventional steel dies are used to stamp out the notches, to define rectanges nominally 25 by 66 mm. The rectangles are longitudinally spaced apart 15 mm and laterally spaced 6.4 mm. The longitudinal webs and cross webs are 5 mm wide. After cambering the parts have a concavity of about 1.8 mm as the depth of concavity is measured from the chord line to the curved concave surface.

Although this invention has been shown and described with respect to a preferred embodiment, it will be understood by those skilled in the art that various changes in form and detail thereof may be made without departing from the spirit and scope of the claimed invention.

We claim:
1. The method of making a cambered airfoil article which comprises
   (a) form rolling a flat strip to produce a formed strip with a cross section having a planar first side and an opposing contoured second side, the cross section characterized by two opposing airfoil contours separated by a center rib running in a line along the length of the strip;
   (b) guiding the formed strip into a die using the rib and slotting the strip to create transverse and longitudinal openings therein to define essentially rectangular airfoils on opposing sides of the rib line with each airfoil connected by a web to a longitudinally adjacent airfoil; the opposing longitudinal webs on either side of the rib centerline connected to each other by cross webs;
   (c) bending the rectangular airfoils so connected by webs, to make the planar sides thereof concave, and to form each member into a cambered airfoil; and
   (d) separating the cambered airfoils from the webs.

2. The method of claim 1 characterized by producing a formed strip in which the thinner trailing edge portions of the airfoil contours lie nearest the center rib.

3. The method of claim 1 characterized by bending in the transverse direction each rectangular airfoil to form a concave surface on the planar first side and a convex surface on the contoured second side, which bending yields a percent elongation of the convex side of about five times more than the percent elongation of the concave side.

4. The method of claim 1 characterized by applying a sustained momentary load to the rectangular airfoils after they are cambered in a die, to lessen springback and produce more accurate dimension.

* * * * *